Nov. 26, 1968 J. L. BOTJER ET AL 3,413,610

DISPLAY DEVICE WITH SYNCHRONIZED VIDEO AND BCD DATA IN A CYCLICAL STORAGE

Filed Dec. 29, 1965 4 Sheets-Sheet 1

INVENTORS
JOHN L. BOTJER
EDWARD O. DONNER
HAROLD E. FRYE
HOWARD S. KEELER

BY *Thomas & Thomas* ATTORNEYS

CHARACTER FORMAT MAP FIG. 6

United States Patent Office
3,413,610
Patented Nov. 26, 1968

3,413,610
DISPLAY DEVICE WITH SYNCHRONIZED VIDEO AND BCD DATA IN A CYCLICAL STORAGE
John L. Botjer, Hyde Park, Edward O. Donner, Poughkeepsie, and Harold E. Frye and Howard S. Keeler, Wappingers Falls, N.Y., assignors to International Business Machines Corporation, Armonk, N.Y., a corporation of New York
Filed Dec. 29, 1965, Ser. No. 517,334
4 Claims. (Cl. 340—172.5)

ABSTRACT OF THE DISCLOSURE

A display console having a keyboard connected to conversion apparatus for converting keyboard characters into equivalent digital code and video signals for storage in a delay line buffer storage device having a pair of parallel delay lines the outputs of which are connected through a switch to a television-type display when video signals emanate therefrom and to a load device when digital code signals emanate therefrom, and control means for synchronizing the delay line buffer storage device with the picture frames of the television-type display device so that the digital code signals emanate from the delay line buffer storage device during the frame retrace period.

This invention relates to display devices and more particularly to such devices employed in terminal equipment associated with data processing ssytems.

Each of the various known types of display arrangements for visually presenting characters and symbols, selected at will to form a message, chart or other type of data display, is quite complex and accordingly expensive. The need has long existed for an inexpensive display arrangement, particularly one which is flexible and may be adapted to varied uses and is simple to operate and maintain.

It is a feature of this invention to provide a display arrangement which is efficient in operation, relatively inexpensive to manufacture and maintain.

It is a feature of this invention to provide a display arrangement wherein a television type display device is used in conjunction with a cyclical storage device, and the time period of the cyclical storage device is equal to the time period of one television picture frame which time period includes the display portion of the picture frame as well as the retrace.

It is a feature of this invention to provide a television type display device in conjunction with a cyclical storage device which is synchronized with the television raster; video information is stored in one time portion of the cyclical storage device; and the equivalent of the video information in the form of coded digital information is stored in another time portion of the cyclical storage device.

It is a feature of this invention to provide a television type display device for use with a cyclical storage device which is synchronized with the television type display device, and video information stored in one time portion of the cyclical storage device is presented to the display device while coded digital information stored in another time portion of the cyclical storage device is selectively supplied to a load device.

It is a feature of this invention to provide a store, display and forward, data handling system including a display unit having spot trace of variable visibility moving in a cyclic raster pattern across a viewing surface, a cyclical buffer store operating in synchronism with the movement of the spot trace, writing means synchronized with masked segments of constant visibility in the display trace for entering video or graphic information into the store in a symbolic code notation corresponding to an image of graphic symbols representative of the information, additional writing means synchronized with variable segments of the trace pattern for storing the same information in the cyclic buffer store in a digital code notation, switching means coupled to the output of the cyclic buffer store which may selectively connect the display unit to the cyclic buffer store for directly controlling the visibility of the trace spot with the stored video or graphic symbol information thereby to produce a corresponding graphic image on the viewing screen or for selectively connecting the cyclic buffer store to a load device for transferring information in the digital code notation to the load device.

It is a further feature of this invention to provide a display arrangement including a display device having a cyclical moving trace, a buffer store accessible in synchronism with the pattern of movement of the trace, means for storing intensity modulation information in the buffer store for controlling the image produced by the trace, and means for storing other information in the buffer store in positions corresponding to blanked segments of the picture image conveyed by the intensity modulation information.

In one arrangement according to the present invention an improved display arrangement is provided wherein parallel binary coded data signals from an imput device, such as a keyboard, are converted to video signals by a composer and to binary coded decimal signals in serial form by a parallel-serial converter. The video signals are stored in one portion of the time cycle of a cyclical delay line buffer, and the binary coded decimal signals are stored in a different time portion of the cyclical delay line buffer. The cyclical delay line buffer has its output connected to a television-type display device. The time period of the cyclical delay line buffer is equal in time duration to the time required to generate one television raster, including the display time and the retrace time. The video information is stored in that portion of the delay line which is presented to the television tube when it is unblanked, and the coded digital signals appear at the output of the delay line when the television tube is blanked and undergoing vertical retrace. The video signals generate on the face of the television display tube the same characters which are represented by the digitally coded signals. Thus a message may be typed, displayed, verified and then transmitted to a load device such as a data processing system. Typing errors as well as other types of errors may be detected visually and corrected or deleted at will.

The foregoing and other objects, features and advantages of the invention will be apparent from the following more particular description of a preferred embodiment of the invention, as illustrated in the accompanying drawings.

FIGURES 2 through 7 illustrate the manner in which the displays are generated on the face of the display device in FIGURE 1, and these figures are useful in explaining the format of information stored in the delay line buffer in FIGURE 1.

It is arbitrarily assumed, for purposes of illustration, that positive logic is employed unless indicated otherwise.

Figure 1:
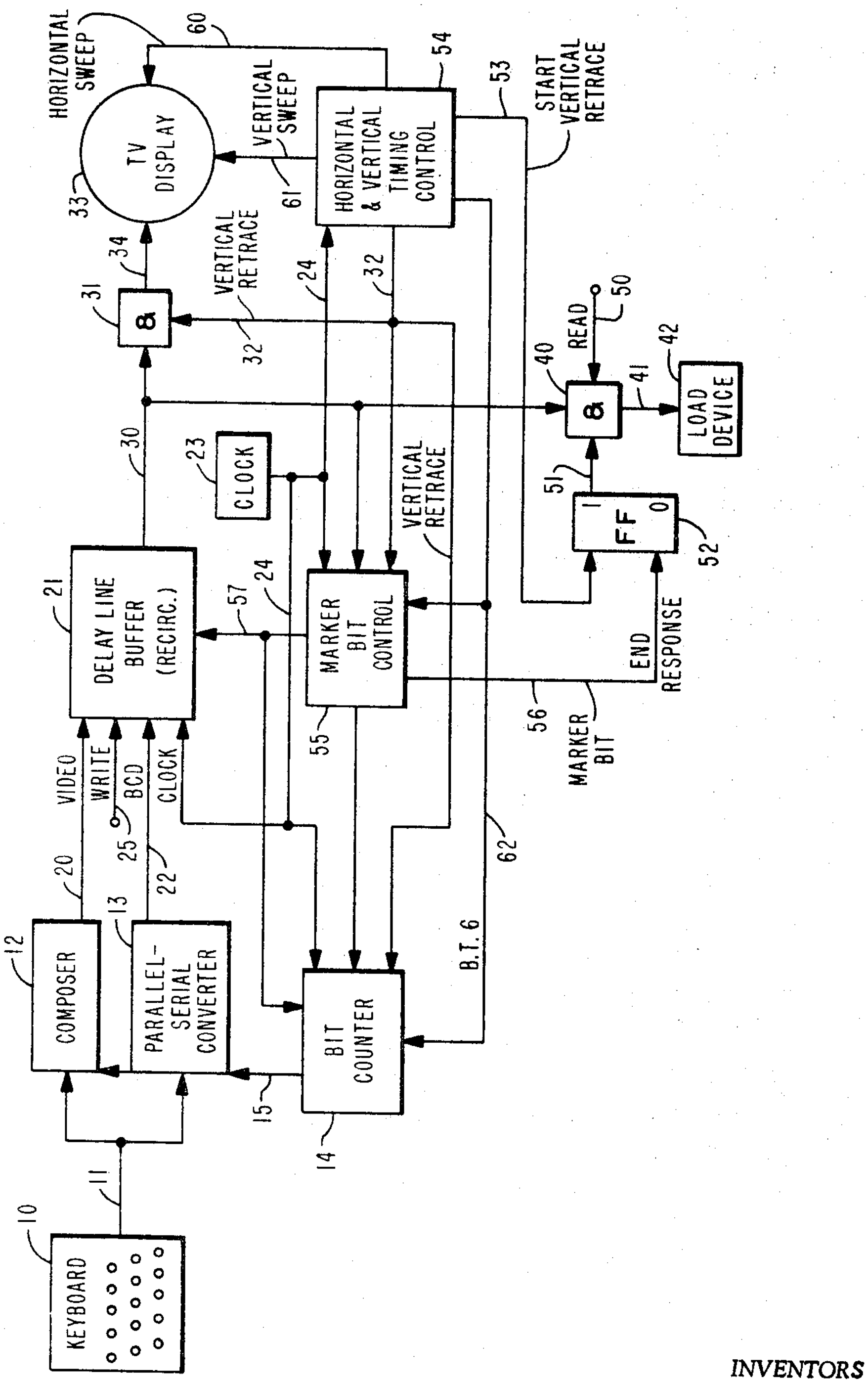
FIGURE 1 is a general block diagram illustrating a preferred embodiment of this invention.

That is, the logic circuits such as And and Or circuits, for example, are operated by positive signal levels at the input to provide a positive signal level at the output. The general block diagram arrangement of a preferred embodiment of the invention is illustrated in FIGURE 1, and it is described with respect to the manner in which the various circuit components or blocks are interconnected and the overall operation performed by each of these components or blocks. The description of the general arrangement is followed by separate and detailed descriptions of the various components or blocks where it is so required, and reference is made to co-pending applications in some instances in order to simplify the description herein. Bold face character symbols appearing within a block identify the common name for the circuit represented e.g. A for an And circuit.

Reference is made to FIGURE 1 which illustrates in block form a system arrangement according to this invention. A keyboard 10 supplies binary coded signals along a cable 11 to a composer 12 and a parallel-serial converter 13. Timed control signals for operating the composer 12 and the parallel-serial converter 13 are supplied by a bit counter 14 along a cable 15. The composer 12 responds to the binary coded signals at its input and supplies a serial train of video signals along a conductor 20 to a delay line buffer 21. The parallel-serial converter 13 responds to the binary coded signals at its input to provide a serial train of binary coded signals on a line 22 to the delay line buffer 21. A clock 23 supplies pulses on a line 24 to the delay line buffer 21. A write line 25 is energized with a positive signal whenever video or binary coded decimal signals are to be stored in the delay line buffer 21. As explained more fully hereinafter, video signals are written in one portion of the delay line cycle, and binary coded decimal signals are written in a different portion of the delay line cycle. Signals at the output of the delay line buffer 21 are supplied on a line 30 to an And circuit 31. This And circuit receives a positive signal on the line 32 at all times except during horizontal and vertical retrace of the TV display 33. Stated alternatively, a positive signal level is supplied on the line 32 to the And circuit whenever the TV display 33 is to be unblanked. Video signals from the delay line buffer 21 are supplied on the line 30 through the And circuit 31 to the TV display 33 at those times when the TV display is not blanked. Binary coded decimal signals from the delay line buffer 21 are supplied on the output line 30 to the And circuit 40 during the vertical retrace time of the TV display 33. The And circuit 31 receives a negative signal level on the control line 32 during the vertical retrace time of the TV display 33, and this prevents the binary coded decimal signals on the line 30 from being supplied to the TV display 33. The binary coded decimal signals on the line 30 are supplied to an And circuit 40 and then along a line 41 to a load device 42 which may be a data processing system. The And circuit 40 is operated by a positive signal on a read line 50 and a positive signal on a line 51 from the one output side of a flip flop 52. The flip flop 52 is set to the one state at the commencement of vertical retrace by a positive signal pulse on a line 53 from the horizontal and vertical timing control 54. This sets the flip flop 52 to the one state, and if the line 50 is energized with a positive signal, binary coded decimal signals stored in the delay line buffer 21 are supplied to the load device 42 until the flip flop 52 is reset to the zero state. A marker bit is stored in the delay line buffer immediately after the last of the binary coded decimal signals. The marker bit is detected by the marker bit control 55. When a marker bit is detected, a positive signal pulse is supplied on a line 56 to the zero input side of the flip flop 52 thereby setting this flip flop to the zero state. This causes a negative signal level to appear on the line 51 from the one output side of the flip flop 52, and this negative signal level deconditions the And circuit 40, thereby preventing the transfer of further information from the delay line buffer 21 to the load device 42.

The horizontal and vertical timing control 54 supplies horizontal sweep signals on a line 60 to the TV display, and it supplies vertical sweep signals on a line 61 to the TV display 33. The timing for these sweep signals is controlled by the clock 23 which supplies clock pulses on a line 24 to the horizontal and vertical timing control 54. The blank and unblank signals are supplied by the horizontal and vertical timing control 54 on the line 32 to the And circuit 31, and the output of this And circuit is supplied on a line 34 to the TV display device 33. A timing pulse (BT 6) is supplied by the horizontal and vertical timing control 54 on a line 62 to the bit counter 14 to synchronize its operation for writing purposes. This timing pulse on the line 62 is supplied also to the marker bit control 55 to synchronize its operation.

Figure 2:
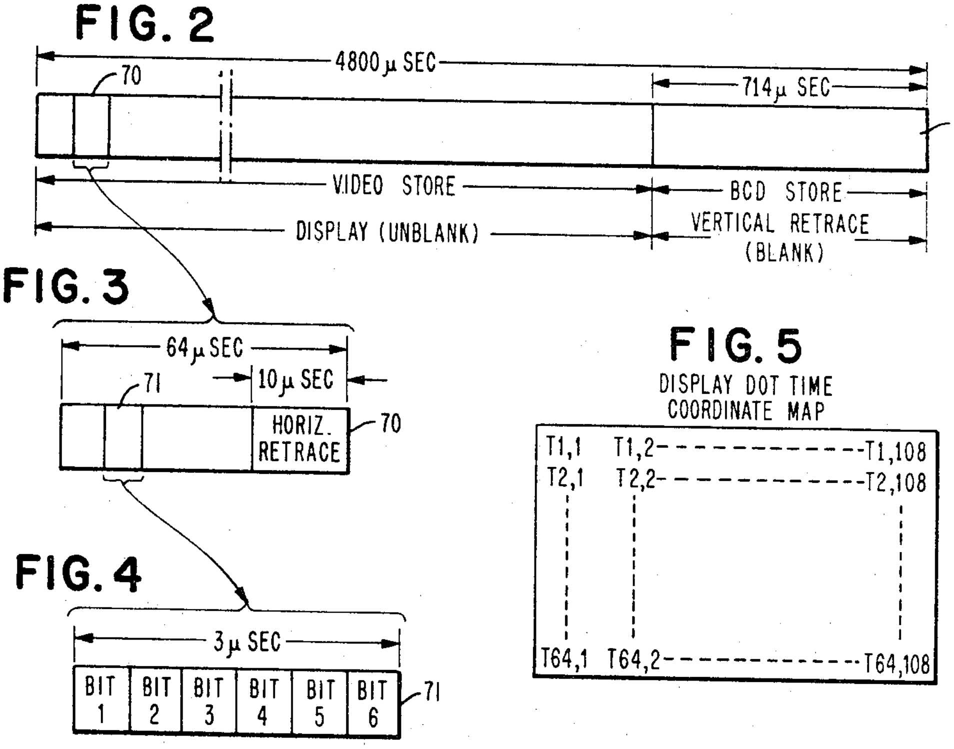
Figures 3, 4, 5:
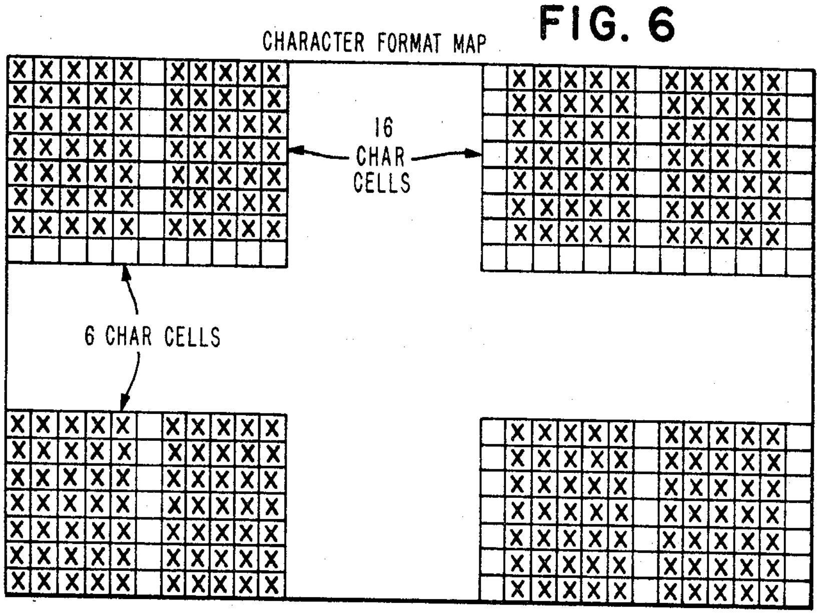

Reference is made to FIGURES 2 through 7 for a discussing of the timing aspects of the TV display 33 in FIGURE 1. In one arrangement constructed according to this invention, the length of the delay line buffer 21 in FIGURE 1 was made 4800 microseconds long. A retrace at the end of the last horizontal line was eliminated, and vertical retrace was started at this point in time. The delay line cycle is depicted at 69 in FIGURE 2 with a vertical retrace portion which is 714 microseconds in duration and a display portion which is 4086 microseconds in duration, providing a combined duration of 4800 microseconds for the total delay line. As illustrated in FIGURE 2, binary coded decimal (BCD) information is stored in the vertical retrace portion of the delay line, and video information is stored in the display portion of the delay line. Symbols, characters and other information may be pictorially represented on the face of the TV display by the video information stored in the delay line. A display dot time coordinate map for the face of the TV display is illustrated in FIGURE 5. The time for displaying the first dot on the first line is designated T1, 1, and subsequent dots are successively displayed to the right until the last dot time for line 1 which is designated T1, 108. There are a total of 108 dot times per line of the TV display, and there are a total of 64 lines per frame as depicted in FIGURE 5.

FIGURE 6 illustrates the character format for the TV display. It includes a matrix on the face of the TV display which is 18 character cells wide and 8 character cells high. Each character cell constitutes a matrix which is 6 bits wide and 8 bits high. Five of the six horizontal bits may be used for video display, and the sixth bit serves as a marker bit which is removed when the next character is stored adjacent thereto, thereby providing horizontal spacing between adjacent characters. A blank horizontal line is provided between rows of characters for vertically spacing the characters. A total of 8 times 18 or 144 characters may be displayed on the face of the TV tube.

Figure 7:
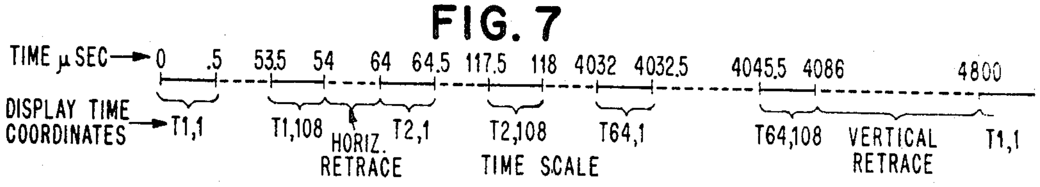

FIGURE 7 depicts the relationship between the delay line length, the dot time coordinates of the display, the horizontal sweeps and the vertical retrace which constitute one raster. This diagram is helpful in coordinating the relationships outlined in FIGURES 2 through 6. This diagram is helpful also in correlating the relationship of the electron beam as it cycles through the character format in FIGURE 6, including horizontal and vertical retraces, with events in the delay line as illustrated in FIGURES 2 through 4. It is pointed out that in FIGURE 7 the vertical retrace commences at the time of 4086 microseconds of the delay line cycle and continues until 4800 microseconds which is the end of the delay line cycle and the beginning of the next delay line cycle. The time duration of the vertical retrace period is 11 horizontal lines ($11\times64$) or 704 microseconds plus 10 microseconds for a total of 714 microseconds. Vertical retrace starts at the point in time where the horizontal retrace commences in the 64th line. In other words, vertical retrace starts 10 microseconds early because horizontal retrace is not required in the last line of the video display.

Marker bits are inserted initially in the delay line buffer prior to performing writing operations of video and BCD signals. One marker bit is inserted in each horizontal line of the TV display. It is inserted in the delay line buffer at a point in time which occurs one bit time before horizontal retrace ends. Also, one marker bit is inserted in the first bit position of the BCD portion of the delay line buffer. It is inserted in the delay line buffer at a point in time which is first bit period of vertical retrace.

The video portion of the delay line in FIGURE 2 stores video signals for each horizontal sweep. One horizontal sweep portion is designated at 70 in FIGURE 2, and as illustrated more specifically in FIGURE 3, there are 64 microseconds allotted in the delay line for each horizontal line of the TV display. This 64 microsecond period includes 10 microseconds for horizontal retrace, during which time the electron beam of the TV tube is blanked, and 54 microseconds for displaying characters on the face of the TV display tube during which time the electron beam is unblanked and is modulated under control of the video information signals. Video signals are stored in 6 bit bytes in the horizontal sweep portion of the delay line. One such byte is designated at 71 in FIGURE 4. This byte is illustrated in FIGURE 4 as including bits 1 through 6. Bits 1 through 5 are used for storing video information signals, and bit 6 is used for storing a marker bit whenever a given byte is the last one in a horizontal line. Each 6 bit byte occupies three microseconds in that portion of the delay line in FIGURE 4, and there are 64 horizontal lines per raster where a horizontal retrace period is not allotted to the 64th line.

From the foregoing description of FIGURES 2 through 7 it is readily seen how the display on the face of the TV tube is generated and how the information, both video and BCD, stored in the delay line is synchronized with the display tube. The pictorial representation on the TV display may include letters, numbers, special characters and other types of information.

The keyboard 10, the composer 12, the parallel-serial converter 13 and the bit counter 14 in FIGURE 1 may be any suitable one of various known types, but they are preferably of the type illustrated and described in copending application Ser. No. 512,106 for Improved Display System filed on Dec. 7, 1965 by John L. Bojer et al. which is assigned to the assignee of this invention. Reference is made to that application, and the illustration and description therein are incorporated herein and made a part hereof.

Figure 8:
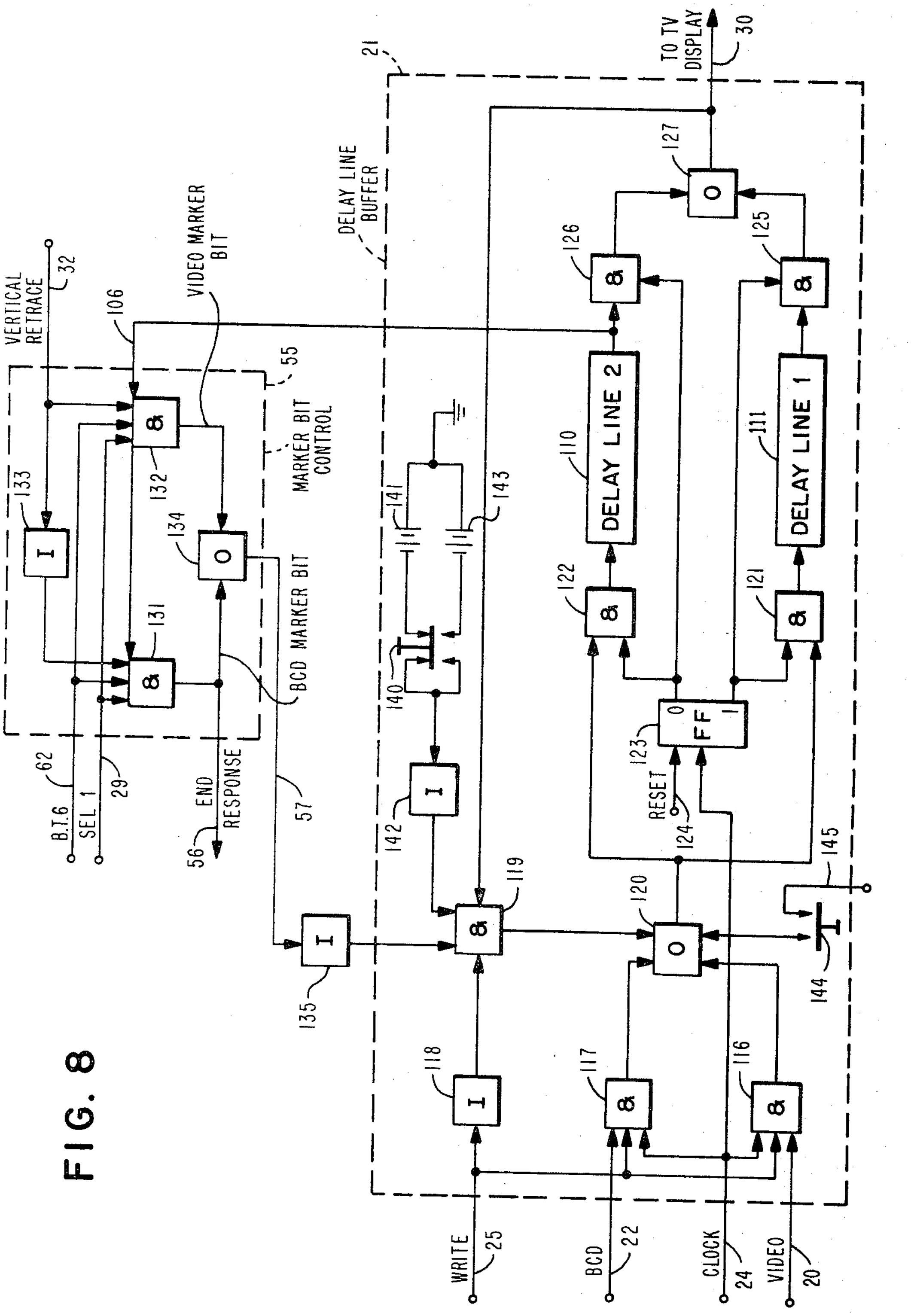
FIGURE 8 illustrates in detail the delay line buffer and the marker bit control shown in block form in FIGURE 1.

The delay line buffer 21 in FIGURE 1 may be any one of various well-known types, but it is preferably of the type illustrated in FIGURE 8. Reference is made next to FIGURE 8 for a detailed illustration of the delay line buffer 21 and the marker bit control 55, shown in block form in FIGURE 1.

Referring next to FIGURE 8, the delay line buffer 21 is described first. It has an And circuit 116, an And circuit 117 and an inverter 118 which are connected as shown to receive input signals from input lines 20, 22, 24 and 25. These logical circuits control the writing of new information in delay lines 110 and 111. An And circuit 119 controls the re-entry of output data from the delay lines to the input thereof, and it also controls the entry of marker bits, as explained subsequently.

All information entered into the delay lines passes through an Or circuit 120 to an And circuit 121 or an And circuit 122. Clock pulses supplied to the line 24 in FIGURE 8 are coupled to the complement input of a flip flop 123. This flip flop is reset to the zero state initially by a signal on a reset line 124, and the clock pulses on the line 24 operate the flip flop 123 to change its state continuously and alternately energize And circuits 121 and 122. Basically, the flip flop acts as a frequency divider which applies odd numbered clock pulses to the And circuit 121 and even numbered clock pulses to the And circuit 122. Data signals to be written into the delay lines are supplied to both of the And circuits 521 and 522, but these data signals are commutated and stored with odd numbered bits in the delay line 111 and the even numbered bits in the delay line 110. The output signals from these delay lines are commutated by the And circuits 125 and 126 each of which has an input from opposite output sides of the flip flop 123. The outputs from the And circuits 125 and 126 are supplied to an Or circuit 127, the output of which is conveyed on the line 30 in FIGURE 8 to the And circuit 31 in FIGURE 1 and then to the TV display 33. The line 30 also supplies the output signals to the And circuit 119 in FIGURE 8 for reinsertion in the delay lines whereby the information may be retained and repetitively presented to the TV display. For a more elaborate description of the operation of the delay line buffer 21 in FIGURE 8, reference is made to co-pending application Ser. No. 487,887 filed Sept. 16, 1965 entitled "Improved Delay Line Buffer Storage Circuit" which is assigned to the assignee of this invention.

Marker bits are inserted in the delay line buffer 21 at bit time 6 of the last BCD byte. BCD information is stored in the delay line at that point in time commencing with the start of vertical retrace and continuing until the last BCD byte is stored at which time a marker bit is inserted at bit time 6 of the last byte. Only one marker bit is employed in that portion of the delay line utilized for storage of BCD information. Marker bits are stored in that portion of the delay line buffer utilized to store video information for the TV displays. Initially, marker bits for the video portion are stored immediately preceding the point in time where each horizontal line sweep commences, and this point in time occurs at bit time 6. Since these video marker bits in the delay line output occur immediately before the horizontal sweep commences for each line in the TV display, they are not visible on the TV display. These are useful in controlling synchronization. If video information is written into the delay line buffer for display on any horizontal line, the present marker bit is destroyed prior to writing, and a new marker bit is inserted immediately at the end of the writing operation. All information stored in the delay line buffer is grouped into 6-bit bytes with the sixth bit in all instances being reserved for the marker bit. When the marker bit is destroyed prior to commencing the writing operation of a new byte, the sixth bit of the preceding byte is left blank, and this provides a space between adjacent characters. Whenever characters are displayed on the TV display, the marker bit appears immediately to the right of the character, and it serves as a cursor. It is especially useful when an operator has intentionally inserted several blank spaces since it permits him to see where the next character may be displayed.

The marker bit control 55 in FIGURE 8 serves two functions. It destroys present marker bits, both video and BCD, prior to a writing operation, and it locates the BCD marker bit during a reading operation. The BCD marker bit in a reading operation signifies that all BCD information has been read, and reading should be terminated. The marker bit control circuit 55 in FIGURE 8 includes And circuits 131 and 132. Both of these And circuits receive a select level on a line 29 bit time and 6 (BT6) pulses on the input line 62. The BT6 pulses occur periodically, but the positive select level on the line 29 is established only when a key is depressed on the keyboard 10 in FIGURE 1. Otherwise a negative level is presented on the line 29. When a positive level is established on the line 29 by depressing any key, this level persists for at least one delay line cycle during which time writing of the depresessed character takes place in the delay line buffer of both BCD and video signals. The select line is energized with a positive signal level when a key is depressed, the keyboard is locked, and the select line is energized with a negative signal when the keyboard is unlocked as described in copending application Ser. No. 512,106 referred to above. Vertical retrace signal levels on the input line 32 are applied to the And circuit 132, and this level is supplied through an inverter 133 to the And circuit 131. The input line 32 is energized with a negative signal level during vertical retrace, and it is energized with a positive signal level when information is displayed on the TV display. Thus the And circuit 131 may be activated at bit time 6 during vertical retrace, and the And circuit 132 may be activated at bit time 6 during the display portion of the delay line cycle if a positive select level is present on the line 29. The And circuit 131 locates the BCD marker bit, and the And circuit 132 locates the video marker bits. The outputs of the And circuits 131 and 132 are supplied through an Or circuit 134, along the conductor 57 to the delay line buffer 21. Signals on the conductor 57 pass through an inverter 135 in the delay line buffer 21 to the And circuit 119.

Since all marker bits are stored in the delay line buffer at bit time 6, they appear in the delay line 110 which stores all even numbered bits. The output of the delay line 110 is supplied on a line 106 to the marker bit control circuit 55. When a marker bit appears on the line 106 during a writing operation, it is passed by either the And circuit 131, when writing BCD information, or the And circuit 132, when writing video information, and it is passed by the Or circuit 134 and the inverter 135 to the And circuit 119. The signal level on the line 57 to the And circuit 119 is normally a positive signal level which conditions the And circuit 119 to permit re-entry into the delay lines of all output signals. When a positive signal pulse representing a marker bit is detected by the marker bit control 55, this positive signal is changed at the output of the inverter 135 to a negative signal which deconditions the And circuit 119 and inhibits the re-entry of the marker bit into the delay line buffer. The marker bit is removed at bit time 6. The period of time it takes a signal from the output of the delay line 110 to pass along the conductor 106, through one of the And circuits 131 or 132, through the Or circuit 134 and inverter 135 to the And circuit 119 is made equal to or less than the time it takes the signal from the ouput of the delay line 110 to pass through the And circuit 126 and the Or circuit 127 to the And circuit 119. This timing relationship insures that all portions of the marker bit are destroyed. The space previously occupied by the marker bit is left blank, and new information is inserted in the five bit positions immediately thereafter. The And circuit 131 in the marker bit control 55 supplies an output signal on the line 56 to the zero input side of the flip flop 52 in FIGURE 1, and this signal serves to terminate a read operation of BCD information. It is recalled that a marker bit is stored at the very end of BCD information stored in the delay line buffer. A positive pulse on the output line 57 in FIGURE 8 also is used to operate the bit counter 14 in FIGURE 1 to initiate a writing operation of new information into the delay line buffer, as explained in the above-mentioned co-pending application Ser. No. 512,106.

A cancel switch 140 in FIGURE 8 normally rests in the position shown and supplies a negative signal level from a source 141 to an inverter 142. The inverter thus supplies a positive level from its output to the And circuit 119, thereby conditioning this And circuit to permit re-entry of signals from the delay line which is schematically depicted at 69 in FIGURE 2 with a portion thereof used for storing BCD information and the remainder thereof used for storing video information. When the cancel switch 140 is depressed, it supplies a positive signal level from a source 143 to the inverter 142 which in turn supplies a negative signal level to the And circuit 119, thereby deconditioning this And circuit. This prevents re-entry of signals from the outputs of the delay lines 110 and 111 to the inputs thereof, and all information signals in the delay lines 110 and 111 are erased or destroyed as soon as one delay line cycle is completed. When the cancel switch 140 is released, new signals may be stored in the delay lines 110 and 111. Marker bits are inserted initially in the delay line buffer 21 prior to performing writing operations of video and BCD signals. As explained above, one marker bit is inserted in each horizontal line of the TV display, and it is inserted in the delay line buffer at a point in time which occurs one bit time before horizontal retrace ends. Also, one marker bit is inserted in the first bit position of the BCD portion of the delay line buffer. It is inserted in the delay line buffer at a point in time which is the first bit period of vertical retrace. These initial marker bits are inserted by depressing a switch 144 in FIGURE 8 which is normally open as shown. This passes properly timed positive pulses representing marker bits from a line 145 to the Or circuit 120, and they are stored in the delay line buffer 21. The signals on the line 145 are derived from the horizontal and vertical timing control 54 in FIGURE 1.

Figure 9:
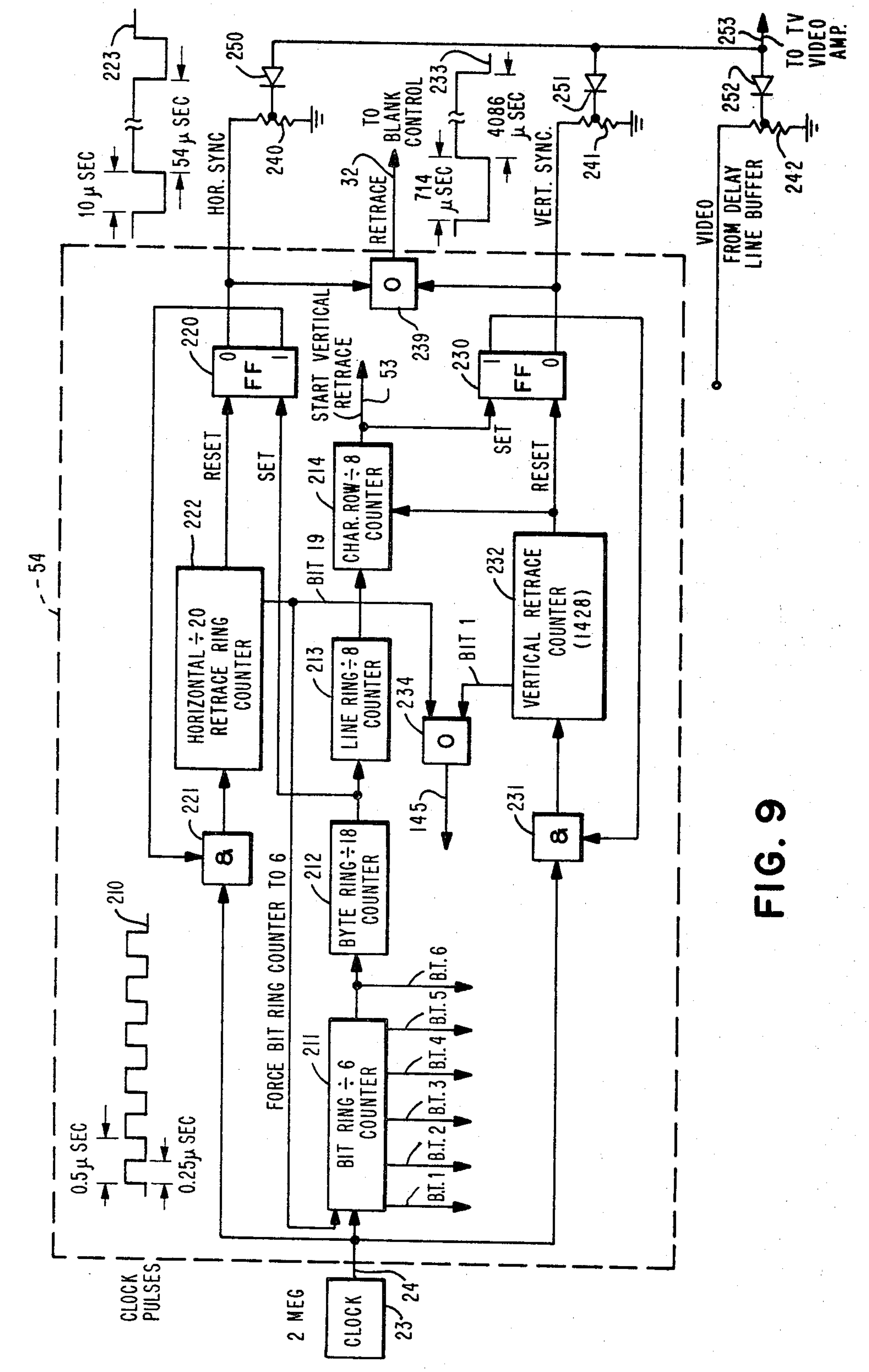
FIGURE 9 is a block diagram which illustrates in detail the horizontal and vertical timing control shown in block form in FIGURE 1.

Reference is made to FIGURE 9 which illustrates in detail the horizontal and vertical timing control 54 in FIGURE 1. FIGURE 9 is a block diagram schematic of one manner in which timing pulses may be generated to operate the TV display 33 as well as the remainder of the system illustrated in FIGURE 1. The clock 23 in FIGURE 16 is operated at 2 megacycles per second, and it supplies clock pulses which are 0.25 microsecond wide and occur every 0.5 microsecond as illustrated by the wave forms 210 in FIGURE 9. The clock pulses are supplied to a bit ring counter 211 which may be a conventional six stage ring circuit that provides output pulses in sequential fashion to the lines labeled bit time (B.T.) 1 through 6. The bit time 6 pulse from each cycle of the bit ring counter 211 is supplied to and counted by a byte ring counter 212 which may be an 18 stage ring circuit. The bit ring counter 211 supplies output pulses at the clock rate for each dot illustrated in the coordinate map of FIGURE 5. The byte ring counter 212 counts the number of bytes in a horizontal line which count also represents the maximum number of characters which may be displayed horizontally. The output pulses from the byte ring counter 212 are supplied to and counted by a line ring counter 213 which may be an eight stage ring counter. A full count of 8 represents the total number of horizontal lines required to display a complete character. FIGURE 6 illustrates that eight horizontal lines are required to generate a complete character. When eight pulses have ben received from the byte ring counter 212 in FIGURE 9, the line ring counter 213 supplies a pulse to a character row ring counter 214 which count represents the number of rows of characters displayed. FIGURE 6 illustrates that there are eight horizontal rows of characters. Thus the character row ring counter 214 has eight stages. When the character row ring counter 214 counts to a value of eight, a signal is developed on the output line 53 to start vertical retrace.

Since a complete TV raster is generated in 4800 microseconds, the clock 23 supplies 9600 pulses during this time period. Thus it is seen that the bit ring counter 211 cycle 1600 times for each TV raster. The byte ring counter 212 cycles 200 times per raster; and the line ring counter 213 cycles 25 times per raster. Accordingly, these counters need not be reset at the commencement of the generation of the next raster since they return to the proper starting point automatically. The character row ring counter 214, however, must be reset when the generation of the next raster begins. It is reset when the vertical retrace is terminated as pointed out below.

When the byte ring counter 212 provides an output pulse to the line ring counter 213, this output pulse is applied to the one input side of a flip flop 220, thereby setting this flip flop. The one output side of the flip flop 220 supplies a positive signal level which conditions an And circuit 221 to pass clock pulses to a horizontal retrace ring counter 222. The nineteenth pulse of the horizontal retrace ring counter forces the counter 211 in step for the beginning of the next line by forcing it to ring position 6. The horizontal retrace ring counter 222 is a 22-stage ring circuit which counts 20 clock pulses and supplies a signal on the twentieth clock pulse to the zero input side of the flip flop 220, thereby resetting this flip flop. The output taken from the zero output side of the flip flop 220 is a negative pulse having a width of ten microseconds and occurring every 54 microseconds as illustrated by the waveform 223 in FIGURE 16.

When vertical retrace is started by a positive output pulse on the line 53 from the character row ring counter 214, a flip flop 230 is set to the one state and this conditions an And circuit 231 to pass clock pulses to a vertical retrace counter 232. This counter must count 1,428 pulses to provide a delay of 714 microseconds. Thus a counter, not a ring circuit, is employed because of the high count involved. An output pulse from the vertical retrace counter 232 resets the flip flop 230 and resets the character row ring counter 214. The zero output side of the flip flop 230 provides a vertical retrace pulse which is a negative signal level 714 microseconds in duration which occurs every 4086 microseconds as illustrated by the waveform 233. The zero outputs of the flip flops 220 and 230 are connected through an Or circuit 239 to the line 32.

The TV display includes a set of resistors 240 through 242 connected as shown through respective diodes 250 through 252 to an output line 253. Horizontal synchronization signals, vertical synchronization signals, and video signals are combined to form a composite signal on the output line 253 to the TV video amplifier of the TV display. The TV display 33 in FIGURE 1 receives retrace, horizontal and vertical control signals on respective lines 34, 60 and 61 from the horizontal and vertical timing control 54 in FIGURE 9. The TV display 33 in FIGURE 1 is preferably a television set, and it may be any one of numerous television sets which are commercially available. The composite signal on the line 253 in FIGURE 9 is injected in the TV set at the point where the output of the detector normally feeds the TV video amplifier, and it may be advisable to disconnect the detector from the video amplifier before injecting the composite signal. This is a precaution to protect the detector diode. The vertical size control and the horizontal size control of a commercial television set may be adjusted to vary the size of the television display. It may be necessary in some instances to change the potentiometers in the vertical and horizontal size control circuits in order to obtain additional range.

Marker pulses for initial insertion in the delay line buffers are supplied by the horizontal retrace ring counter 222 in FIGURE 9 and the vertical retrace counter 232 to an Or circuit 234. The horizontal retrace ring counter 222 supplies a positive pulse from its stage 19 to the Or circuit 234 during each horizontal retrace, and the vertical retrace counter 232 supplies a positive signal from its first stage to the Or circuit 234 during each vertical retrace. These signals are stored in the delay line buffers when, as explained in the description of FIGURE 8, the operator depresses the switch 144 in FIGURE 8.

Thus, it is seen from the foregoing description that a novel display arrangement is provided wherein information may be stored, displayed, and forwarded by energizing the read line 50 in FIGURE 1 when verified to be correct. Alternatively, erroneous data may be canceled or removed from the storage device by depressing the switch 140 in FIGURE 8. The invention is relatively simple in construction, and accordingly it is relatively inexpensive to manufacture and maintain. Furthermore, it is adaptable to many and varied uses.

While the invention has particularly shown and described with reference to a preferred embodiment thereof, it will be understood by those skilled in the art that various changes in form and details may be made therein without departing from the spirit and scope of the invention.

What is claimed is:

1. A display system including:

a television-type display device having a picture frame which is repetitively generated, the repetitively generated picture frame having a cyclical time period which includes a display portion wherein a plurality of lines are generated to form a graphic visual presentation on the face of the television-type display device and a frame retrace portion which takes place between the last line and the first line of the graphic display on the face of the television-type display device;

a delay line buffer storage device including first and second delay lines connected in parallel, input means for supplying (a) digital code signals representing characters and symbols and (b) video signals for graphically presenting such characters and symbols, switch means connecting the input means alternately and repetitively first to one then the other of said one end of the first and second delay lines whereby the digital code signals and video signals are distributed in both the first and second delay lines, feedback means connecting the other end of the first and second delay lines through the switch means to said one end of the first and second delay lines for permitting the repetitive recirculation of video and digital code signals through the first and second delay lines, said input means including first control means to insert video signals in said delay line buffer storage device during the display portion of a repetitively generated picture frame when a graphic image is being generated on the television-type display device and second control means to insert digital code signals in said delay line buffer storage device during the frame retrace portion of a repetitively generated picture frame;

a load device;

output means connecting the other end of the first and second delay lines (1) to the television-type display device when video signals emanate from the first and second delay lines and (2) to the load device when digital code signals emanate from the first and second delay lines;

control means coupled to the television-type display device and the delay line buffer storage device to synchronize the repetitively recirculated video signals and the digital code signals of the delay line buffer storage device with the repetitively generated picture frames of the television-type display device; and further control means connected to the feedback means of the delay line buffer storage device for removing undesired signals from the delay line buffer storage, whereby digital code signals representing characters and symbols may be displayed, verified, and then transmitted to a load device.

2. The device in claim 1 wherein the control means includes a clock connected to counter means, and the counter means in turn provide control signals to circuit means which is coupled to the television-type display device and generates horizontal and vertical sweep control signals for the television-type display device.

3. A display system including:

a delay line buffer storage device having an input and an output;

a television-type display device;

first means connecting the output of the delay line buffer storage device to the television-type display device;

a control device coupled to the delay line buffer storage device and the television-type display device which synchronizes the delay line buffer storage device and the television-type display device;

said television-type display device having a picture frame which is repetitively generated, the repetitively generated picture frame having a cyclical time period which includes a display portion wherein a plurality of lines are generated to form a graphic visual presentation on the face of the display device and a frame retrace portion which takes place between the last line and the first line of the graphic display on the face of the television-type display device;

said delay line buffer storage device including first and second delay lines connected in parallel, an input device for supplying input signals which are (a) digital code signals representing characters and symbols and (b) video signals for graphically presenting such characters and symbols, second means connected between the input means and the input of the delay line buffer storage device, said second means serving to supply the input signals alternately and repetitively first to one end of the first delay line and then to one end of the second delay line at the input of said delay line buffer storage device whereby the digital code signals and the video signals are distributed in both the first and second delay lines, feedback means connecting the other end of the first and second delay lines at the output of the delay line buffer storage device through the second means to said one end of the first and second delay lines at the input of said delay line buffer storage device for permitting the repetitive recirculation of video and digital code signals through the first and second delay lines, said input means including first control means to insert video signals in said delay line buffer storage device during the display portion of a picture frame when a graphic image is being generated on the television-type display device and second control means to insert digital code signals in said delay line buffer storage device during the frame retrace portion of a picture frame;

a load device, said load device being connected to said first means, said first means connecting the output of the delay line buffer storage device (1) to the television-type display device when video signals emanate from the first and second delay lines and (2) to the load device when digital code signals emanate from the first and second delay lines;

said control device serving to synchronize the repetitively recirculated video signals and digital code signals of the delay line buffer storage device with the repetively generated picture frame of the television-type display device with the video signals emanating from the delay line buffer storage device during the time period when the graphic presentation is being generated on the face of the television-type display device and the digital code signals emanating from the output of the delay line buffer storage device during the retrace portion of a picture frame of the television-type display device; and further control means connected to the feedback means of the delay line buffer storage device for temporarily inhibiting the passage of signals through the feedback means from the output to the input of said delay line buffer storage device thereby to remove undesired signals from the delay line buffer storage device;

whereby digital code signals representing characters and symbols may be displayed, verified, and then transmitted to a load device.

4. The device in claim 3 wherein the control device includes counter means, a clock connected to the counter means for supplying control pulses thereto, circuit means connected to the counter means which responds to control signals from the counter means to provide horizontal and vertical sweep control signals for the television-type display device.

References Cited

UNITED STATES PATENTS

| | | | |
|---|---|---|---|
| 3,241,120 | 3/1966 | Amdahl | 340—172.5 |
| 3,248,705 | 4/1966 | Dammann et al. | 340—172.5 |
| 3,307,156 | 2/1967 | Durr | 340—172.5 |

PAUL J. HENON, *Primary Examiner.*

R. B. ZACHE, *Assistant Examiner.*